(12) United States Patent
Marmur et al.

(10) Patent No.: US 7,278,816 B2
(45) Date of Patent: Oct. 9, 2007

(54) LOCKING MECHANISM FOR A DOUBLE ARTICULATING HOOK LIFT APPARATUS USABLE MOUNTED ON A VEHICLE

(75) Inventors: Lazar Marmur, Plainsboro, NJ (US); Gregory Krasnopolskiy, Trenton, NJ (US)

(73) Assignee: Automated Waste Equipment Co., Inc., Trenton, NJ (US)

( * ) Notice: Subject to any disclaimer, the term of this patent is extended or adjusted under 35 U.S.C. 154(b) by 238 days.

(21) Appl. No.: 11/064,190

(22) Filed: Feb. 23, 2005

(65) Prior Publication Data

US 2006/0193716 A1   Aug. 31, 2006

Related U.S. Application Data

(60) Provisional application No. 60/638,235, filed on Dec. 23, 2004.

(51) Int. Cl.
*B60P 5/00* (2006.01)

(52) U.S. Cl. .................. 414/491; 414/498
(58) Field of Classification Search ............. 414/491, 414/457, 476
See application file for complete search history.

(56) References Cited

U.S. PATENT DOCUMENTS

| | | | |
|---|---|---|---|
| 3,404,792 A | 10/1968 | Frieberg | |
| 3,819,075 A | 6/1974 | Derain | |
| 3,825,137 A | 7/1974 | Mackrill et al. | |
| 3,848,758 A | 11/1974 | Carter | |
| 3,874,537 A | 4/1975 | Kou | |
| 3,878,948 A | 4/1975 | Corompt | |
| 3,892,323 A * | 7/1975 | Corompt | 414/491 |
| 3,942,664 A | 3/1976 | Lemaire | |
| 3,964,625 A | 6/1976 | Wirz | |
| 3,984,013 A | 10/1976 | Wirz | |
| 3,987,918 A | 10/1976 | Corompt | |
| 3,988,035 A * | 10/1976 | Corompt | 298/12 |
| 4,009,791 A * | 3/1977 | Derain | 414/477 |
| 4,053,074 A | 10/1977 | Lemaire | |
| 4,073,396 A | 2/1978 | Derain | |
| 4,111,321 A * | 9/1978 | Webster | 414/549 |
| 4,147,266 A | 4/1979 | Corompt | |
| 4,175,904 A | 11/1979 | Airaksinen | |
| 4,204,793 A | 5/1980 | Lemaire | |
| 4,225,281 A * | 9/1980 | Bibeau et al. | 414/498 |

(Continued)

*Primary Examiner*—Patrick Mackey
*Assistant Examiner*—Joshua I Rudawidtz
(74) *Attorney, Agent, or Firm*—Sperry, Zoda & Kane

(57) ABSTRACT

A double articulating hook lifting apparatus usable mounted upon a truck or trailer for loading and unloading containers with respect thereto and also being usable for dumping the containers. The locking mechanism operates to secure a movable arm to the pivot frame 2 to stop pivotal movement relative to one another, which also facilitates the movement required for dumping of the contents of the container while mounted on the vehicle. The Locking device is automatically allowed to move to the locked position by the movement of the jib away from the arm, preferably in a telescoping manner. This movement occurs as the last step in the sequence of container loading to thereby automatically provide locking between the arm and the pivot frame 2 to prevent pivotal relative movement therebetween whenever the container is in the loaded position or is in dumping mode. As the container unloading sequence is initiated the jib moves toward the arm or telescopingly thereinto which powers unlocking of the locking mechanism as the first step in the sequence of container unloading.

19 Claims, 9 Drawing Sheets

U.S. PATENT DOCUMENTS

| | | | |
|---|---|---|---|
| 4,290,726 A | 9/1981 | Sutela et al. | |
| 4,341,500 A | 7/1982 | Laitinen | |
| 4,344,731 A | 8/1982 | Visa et al. | |
| 4,350,469 A | 9/1982 | Corompt | |
| 4,453,878 A * | 6/1984 | Paukku | 414/491 |
| 4,548,541 A | 10/1985 | Corompt | |
| 4,589,671 A * | 5/1986 | Boughton | 280/433 |
| 4,755,097 A | 7/1988 | Corompt | |
| 4,755,098 A | 7/1988 | Wulf et al. | |
| 4,802,811 A | 2/1989 | Nijenhuis | |
| 4,848,619 A | 7/1989 | Corompt | |
| 4,854,807 A | 8/1989 | Bishop | |
| 4,911,318 A * | 3/1990 | Bishop | 220/1.5 |
| 4,915,567 A | 4/1990 | Ellingsen | |
| 4,951,999 A | 8/1990 | Rudolph et al. | |
| 5,007,792 A | 4/1991 | Wiedeck et al. | |
| 5,044,861 A * | 9/1991 | Kirchhoff et al. | 414/332 |
| 5,102,284 A | 4/1992 | Raisio | |
| 5,108,247 A | 4/1992 | Vlaanderen | |
| 5,163,800 A | 11/1992 | Raisio | |
| 5,203,668 A | 4/1993 | Marmur | |
| 5,213,466 A | 5/1993 | Bubik | |
| 5,290,138 A | 3/1994 | Smart et al. | |
| 5,531,559 A * | 7/1996 | Kruzick | 414/498 |
| 5,542,807 A | 8/1996 | Kruzick | |
| 5,542,808 A | 8/1996 | Chiron et al. | |
| 5,597,281 A | 1/1997 | Croiset et al. | |
| 5,601,393 A * | 2/1997 | Waldschmitt | 414/498 |
| 5,743,700 A | 4/1998 | Wood, Jr. et al. | |
| 5,803,699 A | 9/1998 | Pinkston | |
| 5,967,735 A | 10/1999 | Smart et al. | |
| 6,092,863 A | 7/2000 | Hagenbuch et al. | |
| 6,158,947 A | 12/2000 | Goiran et al. | |
| 6,332,746 B1 * | 12/2001 | Lang et al. | 414/494 |
| 6,406,247 B1 | 6/2002 | Ghiretti et al. | |
| 6,457,931 B1 | 10/2002 | Chapman | |
| 6,547,506 B1 | 4/2003 | Jacob | |
| 6,558,104 B1 * | 5/2003 | Vlaanderen et al. | 414/498 |
| 6,669,433 B1 | 12/2003 | De Kock | |
| 6,705,823 B2 | 3/2004 | Bohata | |
| 6,712,578 B2 | 3/2004 | Chabanas et al. | |
| 6,726,431 B2 | 4/2004 | Morrell | |
| 6,749,389 B1 * | 6/2004 | Vlaanderen | 414/491 |
| 6,761,524 B2 * | 7/2004 | Chabanas et al. | 414/491 |
| 6,802,686 B1 | 10/2004 | Hastings | |
| 2004/0156701 A1 * | 8/2004 | Scranton et al. | 414/491 |

* cited by examiner

LOCKING MECHANISM FOR A DOUBLE ARTICULATING HOOK LIFT APPARATUS USABLE MOUNTED ON A VEHICLE

This application for utility patent application hereby formally claims priority of U.S. Provisional Patent application No. 60/638,235 filed Dec. 23, 2004 on "LOCKING MECHANISM FOR A DOUBLE ARTICULATING HOOK LIFT APPARATUS USABLE MOUNTED ON A VEHICLE" filed by the same inventors listed herein, namely, Lazar Marmur and Gregory Krasnopolskiy and assigned to the same assignee identified herein, namely, Automated Waste Equipment Co., Inc, which application is currently pending and is hereby formally incorporated by reference as an integral part of the present application.

BACKGROUND OF THE INVENTION

1. Field of the Invention

The present invention deals with the field of devices for carrying containers upon respect to vehicles, normally hook lift trucks or trailers adapted to lift and place a container on the rear portion thereof for loading and also being operable to lift the container from the loaded position for unloading thereof. Such hook lift apparatus designs are also utilized for maintaining the container secured upon the truck while dumping the contents of the container which is similar to operation of a standard dump truck. However, of course, with the present invention the container is completely removable when desired.

2. Description of the Prior Art

Many devices have been utilized for hook lifting and locking of hook lifting mechanisms such as shown in U.S. Pat. No. 3,404,792 patented Oct. 8, 1968 to B. O. Frieberg and assigned to Hiab Hydraulics Corporation on a "Material Handling Device; and U.S. Pat. No. 3,819,075 patented Jun. 25, 1974 to Christian Derain and assigned to Societe Nouvelle des Bennes Saphem on a "Device For Loading A Skip On To A Vehicle"; and U.S. Pat. No. 3,825,137 patented Jul. 23, 1974 to David Mackrill et al and assigned to Sheppard Equipment Limited on a "Vehicle For Transporting A Container"; and U.S. Pat. No. 3,848,758 patented Nov. 19, 1974 to Jack N. Carter on a "Hydraulic Truck Bed"; and U.S. Pat. No. 3,874,537 patented Apr. 1, 1975 to Jean Kou on a "Road Vehicle Of The Platform Type"; and U.S. Pat. No. 3,878,948 patented Apr. 22, 1975 to Antoine Corompt and assigned to Bennes Marrel on a "Self-Contained Device For Handling Containers On A Lorry"; and U.S. Pat. No. 3,892,323 patented Jul. 1, 1975 to Antoine Corompt and assigned to Bennes Marrel on a "Container-Handling Deviced For A Self-Loading Vehicle"; and U.S. Pat. No. 3,942,664 patented Mar. 9, 1976 to Pierre Lemaire on a "Device For Handling A Load Bucket Removably Mountable On A Vehicle"; and U.S. Pat. No. 3,964,625 patented Jun. 22, 1976 to Herbert A. Wirz and assigned to Ernst Wirz A G, Kipper-& Maschinenfabrik on an "Apparatus Provided At A Vehicle For Tilting And Loading And Unloading A Receptacle By A Rolling Action"; and U.S. Pat. No. 3,984,013 patented Oct. 5, 1976 to Herbert Wirz on a "Roll-On Mechanism For Loading A Container Onto A Vehicle"; and U.S. Pat. No. 3,987,918 patented Oct. 26, 1976 to Antoine Corompt on a "Device For Loading Or Unloading Boxes Or Removable Buckets, In Particular For Lorries"; and U.S. Pat. No. 3,988,035 patented Oct. 26, 1976 to Antoine Corompt and assigned to Bennes Marrel on a "Locking Device, In Particular For A Handling Cranked Arm Mounted On A Vehicle"; and U.S. Pat. No. 4,009,791 patented Mar. 1, 1977 to Christian Derain and assigned to Societe Nouvelle des Bennes Saphem on a "Truck Dump-Body Operating Mechanism"; and U.S. Pat. No. 4,053,074 patented Oct. 11, 1977 to Pierre Lemaire on a "Device For Handling A Vehicle-Carried Container"; and U.S. Pat. No. 4,073,396 patented Feb. 14, 1978 to Christian Derain and assigned to Societe Nouvelle des Bennes Saphem on a "Movable Container Adjustable In Height, For Loading On A Vehicle"; and U.S. Pat. No. 4,111,321 patented Sep. 5, 1978 to Raymond George Webster and assigned to Edbro Limited on "Mechanisms For Loading And Unloading Containers Onto And From A Vehicle"; and U.S. Pat. No. 4,147,266 patented Apr. 3, 1979 to Antoine Corompt and assigned to Bennes Marrel on a "Semi-Trailer For Handling And Transporting Standardized Containers"; and U.S. Pat. No. 4,175,904 patented Nov. 27, 1979 to Markku Airaksinen and assigned to Multilift Oy on an "Apparatus For Mounting, Demounting, and Tipping Vehicles"; and U.S. Pat. No. 4,204,793 patented May 27, 1980 to Pierre H. Lemaire on a "Device For Handling Containers"; and U.S. Pat. No. 4,225,281 patented Sep. 30, 1980 to Jean-Marie Bibeau et al on a "Self-Loading Container Carrier Truck"; and U.S. Pat. No. 4,290,726 patented Sep. 22, 1981 to Leo Sutela et al and assigned to Oy Partek AB on "Equipment For Loading Of An Exchange Platform Or Container"; and U.S. Pat. No. 4,341,500 patented Jul. 27, 1982 to Heikki Laitinen and assigned to Oy Partek Ab on "Loading Equipment"; and U.S. Pat. No. 4,344,731 patented Aug. 17, 1982 to Heikki Visa and assigned to Oy Partek AB on "Equipment For Raising An Exchange Platform Or Container To A Horizontal Position Above The Level Of The Transport Position"; and U.S. Pat. No. 4,350,469 patented Sep. 21, 1982 to Antoine Corompt and assigned to Bennes Marrel S. A. on a "Handling Device Mounted On A Vehicle to Carry Out The Handling Of Loads Such As Skips And Containers"; and German Patent No. 8303331 patented Sep. 29, 1983 Rhijnsburer on a "Omega Container"; and U.S. Pat. No. 4,453,878 patented Jun. 12, 1984 to Teuvo Paukku and assigned to OY Partek AB on a "Lock Device For Loading Equipment"; and U.S. Pat. No. 4,548,541 patented Oct. 22, 1985 to Antoine Corompt and assigned to Bennes Marrel on a "Method And Apparatus For Unloading A Piece Of Equipment Placed On A Carrying Vehicle"; and U.S. Pat. No. 4,589,671 patented May 20, 1986 to Thomas T. Boughton and assigned to T.T. Boughton & Sons Ltd. On "Load Carrying Road Vehicles"; and U.S. Pat. No. 4,755,097 patented Jul. 5, 1988 to Antoine Corompt and assigned to Bennes Marrel on a "Device For Handling And Transfer Of A Load On A Vehicle Such As A Container Or A Tray"; and U.S. Pat. No. 4,755,098 patented Jul. 5, 1988 to Per Wulf et al and assigned to Oy Partek Ab on "Equipment For Loading A Cargo Space Onto A Vehicle And For Removing The Cargo Space Off The Vehicle"; and U.S. Pat. No. 4,802,811 patented Feb. 7, 1989 to Derk Nijenhuis and assigned to N.C.H. Hydraulische Systemen BV on an "Apparatus For Loading And Unloading An Interchangeable Container Onto And From A Vehicle"; and U.S. Pat. No. 4,848,619 patented Jul. 18, 1989 to Antoine Corompt and assigned to Bennes Marrel on a "Device For The Handling Of A Container"; and U.S. Pat. No. 4,854,807 patented Aug. 8, 1989 to Frank W. Bishop and assigned to George Blair Public Limited Company on a "Freight Container Lifting Means"; and U.S. Pat. No. 4,915,567 patented Apr. 10, 1990 to Svein Ellingsen and assigned to Paccar Inc. on a "Flatrack Loading System And Method For Palletized Loading System"; and U.S. Pat. No. 4,951,999 patented Aug. 28, 1990 to Robert Rudolph and assigned to PM Equipment Sales, Inc. on a "High Lift Dump Truck"; and U.S. Pat. No. 5,007,792 patented Apr. 16, 1991 to Hans Weideck et al on a "Vehicle-Mounted Load Hoisting Device"; and U.S. Pat. No. 5,108,247 patented Apr. 28, 1992 to James Vlaanderen on a "Loading Linkage"; and U.S. Pat. No. 5,163,800 patented Nov. 17, 1992 to Reijo Raisio and assigned to Multilift Oy on a "Transportable Frame And Equipment Frame For Use With Load Handling System"; and U.S. Pat. No. 5,203,668 patented Apr. 20, 1993 to Lazar Marmur and assigned to E. Fisher, L. Marmur, F. Fisher and W. Kimble on an "Apparatus For Loading And Unloading Of A Container Structure Or Other Loads With Respect To A Truck Body Or Trailer"; and U.S. Pat. No. 5,213,466 patented May 25, 1993 to Leslie Bubik and assigned to Vulcan International, Inc. on "Multifunction Loading And Recovery Apparatus"; and U.S. Pat. No. 5,290,138 patented Mar. 1, 1994 to Leslie Smart et al and assigned to American Hook Lift, Inc. on a "Loading and Recovery Apparatus With Self-Locking Arm"; and U.S. Pat. No. 5,531,559 patented Jul. 2, 1996 to Kent Kruzick and assigned to Galbreath, Inc. on a "Vehicle Mounted Hook Hoist For Loading, Transporting And Dumping Containers"; and U.S. Pat. No. 5,542,807 patented Aug. 6, 1996 to Kent Kruzick and assigned to Galbreath Incorporated on a "Vehicle Mounted, Variable Length Hook Hoist"; and U.S. Pat. No. 5,542,808 patented Aug. 6, 1996 to Alain Chiron et al and assigned to Marrel, France on an "Apparatus On A Vehicle To Pick Up A Load"; and U.S. Pat. No. 5,597,281 patented Jan. 28, 1997 to Christian Croiset et al and assigned to Marrel Societe Anonyme on a "Device For Handling Loads From A Vehicle"; and U.S. Pat. No. 5,601,393 patented Feb. 11, 1997 tp Thomas J. Waldschmitt and assigned to Swaokiader U.S.A. on a "Dual Capacity Hook-Lift Hoist"; and U.S. Pat. No. 5,743,700 patented Apr. 28, 1998 to Robert A. Wood, Jr. et al and assigned to John Donovan Enterprises-FL, Inc. on a "Container Covering System"; and U.S. Pat. No. 5,803, 699 patented Sep. 8, 1998 to Donald L. Pinkston and assigned to Capitol Tool and Die Co. on an "Apparatus And Method For Loading And Unloading Containers"; and U.S. Pat. No. 5,967,735 patented Oct. 19, 1999 to Leslie Smart et al and assigned to Krause Plow Corporation on a "Loading And Recovery Apparatus"; and U.S. Pat. No. 6,092,863 patented Jul. 25, 2000 to LeRoy G. Hagenbuch et al and assigned to Phillippi-Hagenbuch, Inc. on an "Assembly For Automatically Opening The Tailgate Of A Container"; and U.S. Pat. No. 6,158,947 patented Dec. 12, 2000 to Thierry Gorian et al and assigned to Marrel Andrezieux-Boutheon on a "Device and Method For Loading And Unloading Containers"; and U.S. Pat. No. 6,406,247 patented Jun. 18, 2002 to Andre Ghiretti et al and assigned to Palfinger AG on an "Apparatus For Loading And Unloading A Container On To And Off A Vehicle"; and U.S. Pat. No. 6,457,931 patented Oct. 1, 2002 to Gordon Chapman on a "Truck Mounted Hoist"; and U.S. Pat. No. 6,547,506 patented Apr. 15, 2003 to Albert Kirk Jacob on a "Multi-Task Truck"; and U.S. Pat. No. 6,558,104 patented May 6, 2003 to James A. Vlaanderen et al and assigned to Stellar Industries, Inc. on a "Container Handling System For A Vehicle"; and U.S. Pat. No. 6,669, 433 patented Dec. 30, 2003 to Hugo De Kock on a "Device For Handling Containers For Road Transport"; and U.S. Pat. No. 6,705,823 patented Mar. 16, 2004 to John F. Bohata on a "Vehicle For Lifting And Transporting Containers"; and U.S. Pat. No. 6,712,578 patented Mar. 30, 2004 to Noel Chabanas et al and assigned to Marrel, Andrezieux-Boutbeon on "Loadhandling Equipment, A Vehicle Incorporating The Equipment And A Method Of Raising A Load With The Equipment"; and U.S. Pat. No. 6,726,431 patented Apr. 27, 2004 to Jay Morrell on a "Container Handling System And Method"; and U.S. Pat. No. 6,761,524 patented Jul. 13, 2004 to Noel Chabanas et al and assigned to Marrel, Andrezieux-Boutheon on "Loadhandling Equipment And Vehicle Incorporating It"; and U.S. Pat. No. 6,802,686 patented Oct. 12, 2004 to Tom Hastings on a "Tip-Up Trailer And Method For Loading The Same".

SUMMARY OF THE INVENTION

The present invention provides a unique configuration for a hook lifting apparatus particularly usable with a truck body but also usable with a trailer body. A jib, arm and pivot frame together define a double articulating assembly which can move a lifting hook to a position where it engages a container to facilitate loading and/or unloading thereof upon the main or fixed frame of the vehicle.

The point of pivot between the pivot frame and the main frame is defined as a first articulation axis. Also a second articulation axis is defined between the arm and the pivot frame. These two articulation axes allow separate and independent movement capabilities for the members attached to each other through these two particular axes. This second articulation capability is only utilized in certain operations and, as such, a need arises for a means for selectively locking of the arm to the pivot frame to prevent the second mode of articulation about the second articulation pivot axis when not required. FIGS. 11A-L show sequence of steps of the movement of the apparatus of the present invention during loading, unloading and dumping. The sequence of moving steps shown in FIGS. 11A through 11K shows the sequence of steps needed for conducting of a common loading operation of a container with respect to a truck body. The complete sequence for unloading is shown by viewing this same sequence of Figures but in reverse order starting with FIG. 11K and running through 11A. In both of these sequences pivoting movement about the first and second articulation axes are required and shown.

On the other hand dumping movement is shown by the two step sequence shown in FIG. 11K and then in FIG. 11L. With this movement operational rotation of the container only about the first articulation axis is performed. Since pivoting of the arm relative to the pivot frame through the second pivot axis is not wanted, the arm must be locked to the pivot frame in some manner during this movement by a locking mechanism such as the locking apparatus shown in the present invention. In this dumping mode of operation the improved construction of the locking means of the present invention must be maintained in the locked position at all times. After dumping the container is again returned from the inclined position by moving from the orientation shown in FIG. 11L to the horizontal position shown in FIG. 11K. During this returning movement to the position of FIG. 11K, the locking mechanism should also remain in the locked position at all times.

With the construction of the present invention, it is preferred that the jib be capable of slidably moving relative to the arm which facilitates the capability of movement between FIGS. 11J and 11K and vice versa. This specific movement is facilitated by constructing the jib such that it possibly can telescopically engage the arm such that the jib and arm are longitudinally moveable with respect to one another. The construction capable of this relative telescoping movement between the jib and the arm is shown best in FIGS. 1 and 2 and others. The slidable engagement between the jib and arm can be achieved with many different structural interconnecting designs, however, a telescopingly slidable engagement is shown in the present embodiment.

As the jib moves to the right slidably with respect to the arm as shown best in FIG. 3, the forwardly extending edge or some other portion of the jib which will cause the linkage to pivot about an axis and urge the pusher to the left as shown in FIGS. 3 and 9. The pusher will contact a pin attached to the locking arm or hook and compress the spring thereby urging it it to the left into the unlocked position. The pusher will overcome the pressure of the opposing spring which is shown on the left in FIG. 3 and cause the lock to disengage.

When the jib moves to the left as shown in FIG. 3 relative to the arm, the pressure exerted upon the rollers will be released allowing the linkage to rotate counterclockwise thereby pulling the pusher away from the locking arm. The locking arm engagement spring or first spring will then urge the locking arm to the right. Thusly, the locking arm engagement spring or first spring will locking arm hook into the locking position for preventing second articulating movement of the arm with respect to the pivot frame. Of course, while the locking arm is disengaged, full articulation of the jib/arm assembly is possible relative to the pivot frame is possible along the second pivot axis.

It is an object of the present invention to provide a locking mechanism for a double articulating hook lift apparatus usable mounted on a vehicle which can easily and conveniently restrict one aspect of relative articulation thereof.

It is an object of the present invention to provide a locking mechanism for a double articulating hook lift apparatus usable mounted on a vehicle which is easy to maintain.

It is an object of the present invention to provide a locking mechanism for a double articulating hook lift apparatus usable mounted on a vehicle which has minimal initial capital costs.

It is an object of the present invention to provide a locking mechanism for a double articulating hook lift apparatus usable mounted on a vehicle which makes use of the required movement of the jib with respect to the arm for achieving the second synergistic purpose of controlling operation of the locking mechanism which restricts the second mode of articulation It is an object of the present invention to provide a locking mechanism for a double articulating hook lift apparatus usable mounted on a vehicle which is usable with many different types of constructions of double articulating hook lifting designs.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
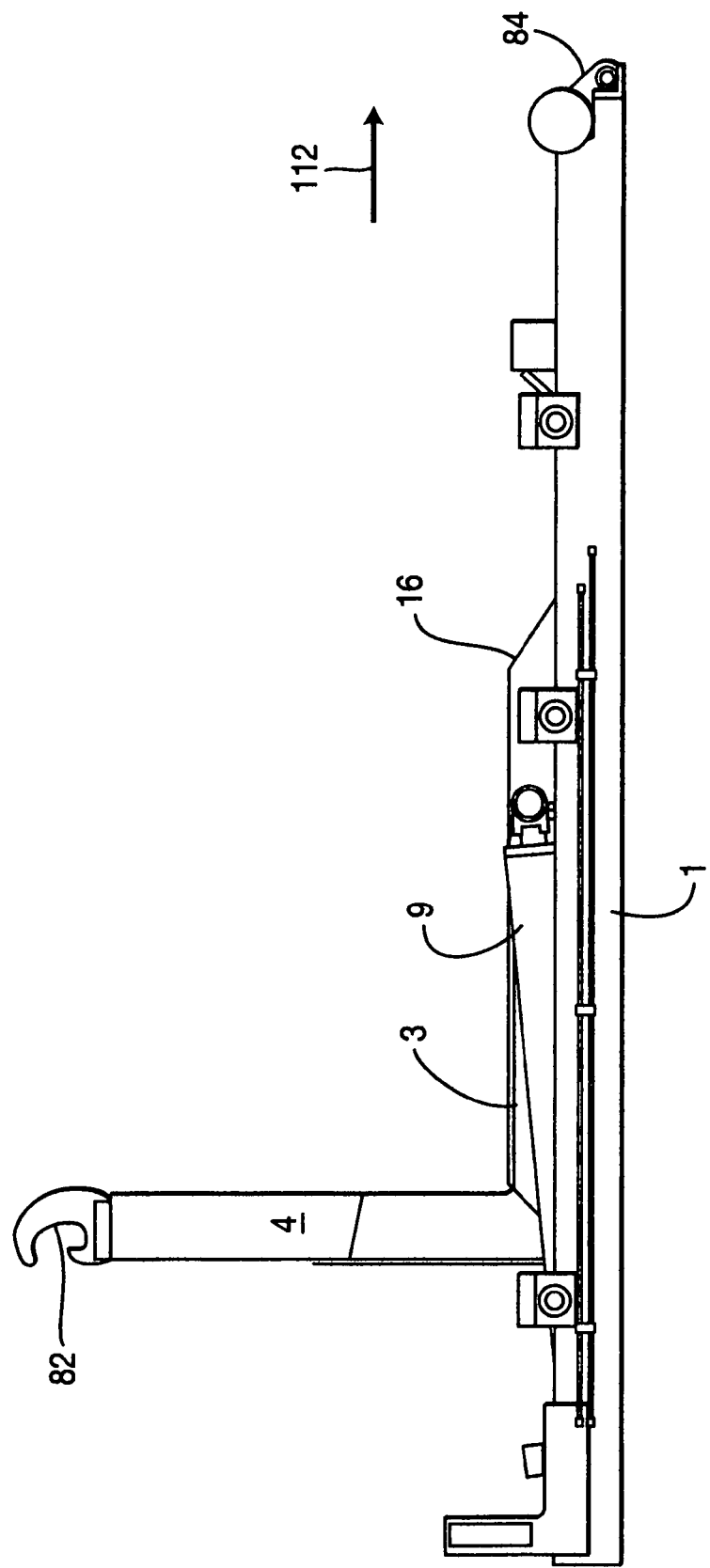
FIG. 1 is a side plan view of an embodiment of a double articulating hook lifting apparatus usable with a vehicle that includes an embodiment of the locking mechanism of the present invention.
Figure 2:
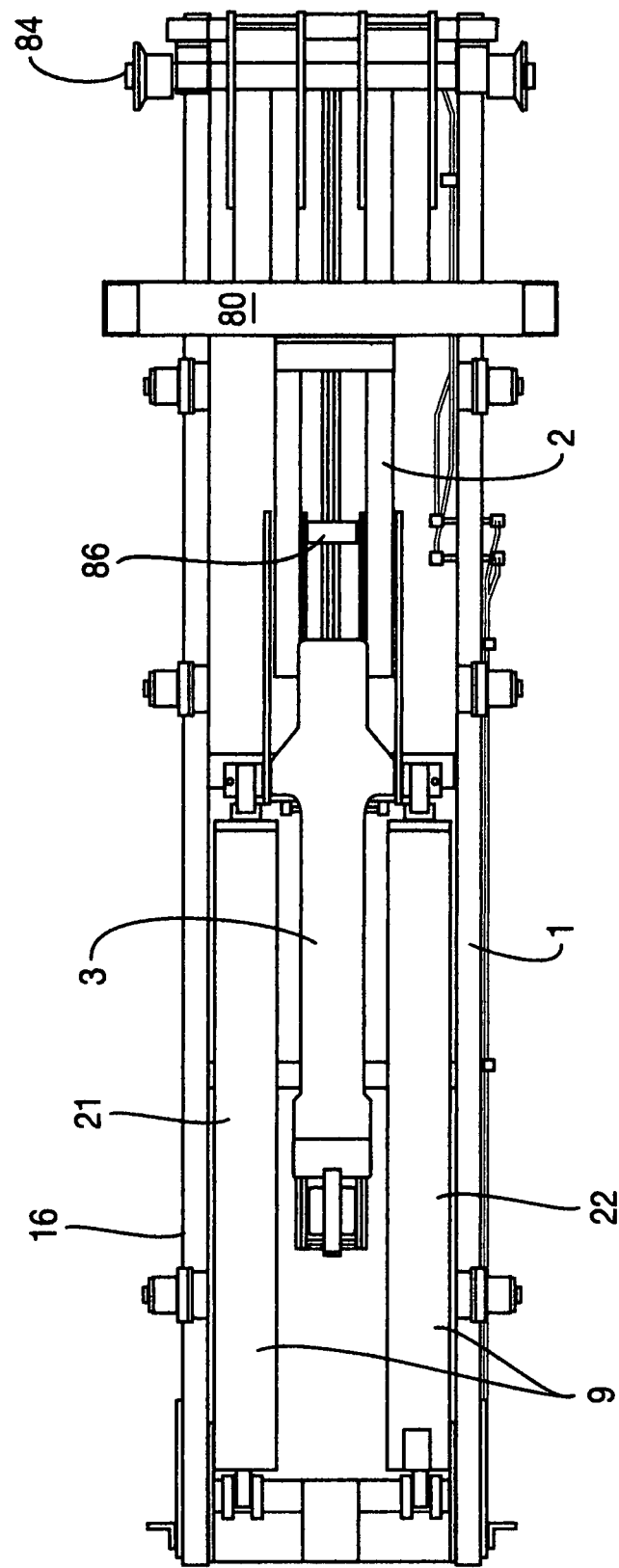
FIG. 2 is a top plan view of the embodiment shown in FIG. 1.

The present invention provides a unique locking system for use with a double articulating hook lift apparatus which can be mounted upon a vehicle such as a truck or trailer for facilitating handling of containers 88 designed for removable mounting thereupon. Commonly, trucks include a fixed or main frame 1 with an independently movable pivot frame 2 pivotally secured with respect to the rear portion thereof. In this embodiment the pivot frame 2 will include an arm 3 which is pivotally movably attached with respect to the pivot frame 2 and a jib 4 movably attached with respect to the arm 3. Preferably the jib 4 is movably engaged with respect to the arm such as to be slidably movably relative thereto. This slidable movement capability can be provided by many different constructions, however with this embodiment of the present invention, a telescopingly movable means of engagement is provided. FIG. 11 shows the construction of this embodiment of the present invention as it moves through the various steps of operation according to a defined sequence for the purpose of container loading and container unloading as well as container dumping.

Figure 11A:
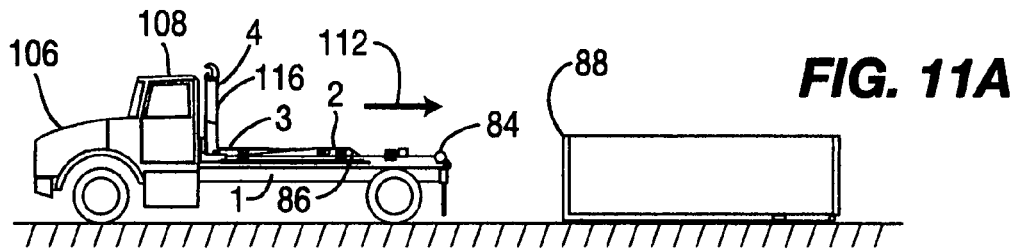
FIG. 11A through L shows the sequence of operation when using the hook lifting apparatus of the present invention in the locked or the unlocked manner in single or double articulation mode during the basic operating procedures which include loading and unloading shown by FIGS. 11A through K and dumping shown by Figures K and L.
Figure 11B:
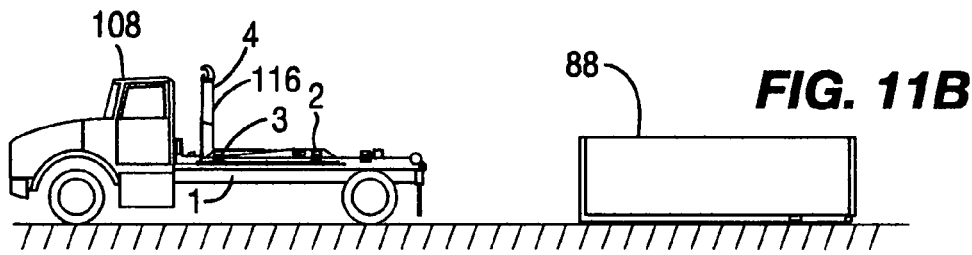
Figure 11C:
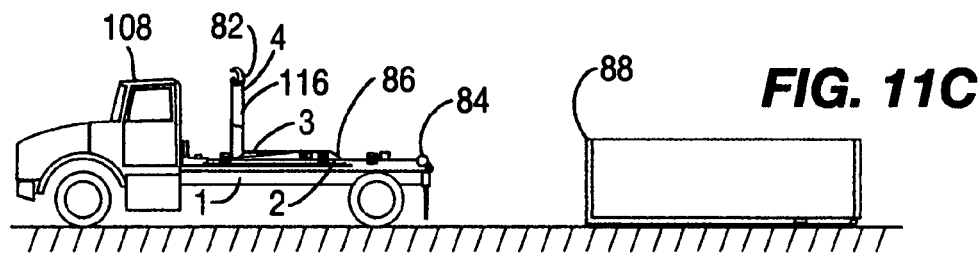
Figure 11D:
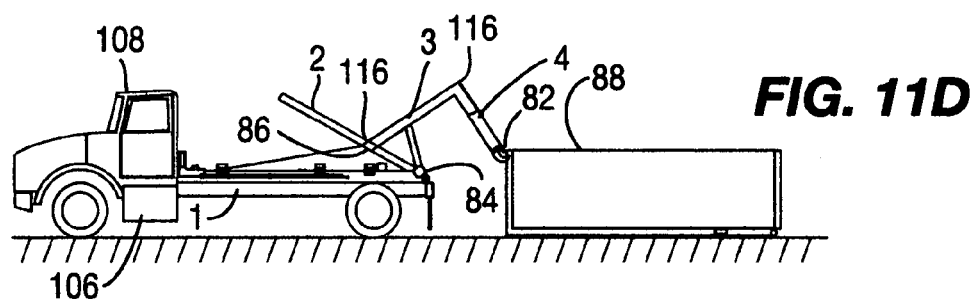
Figure 11E:
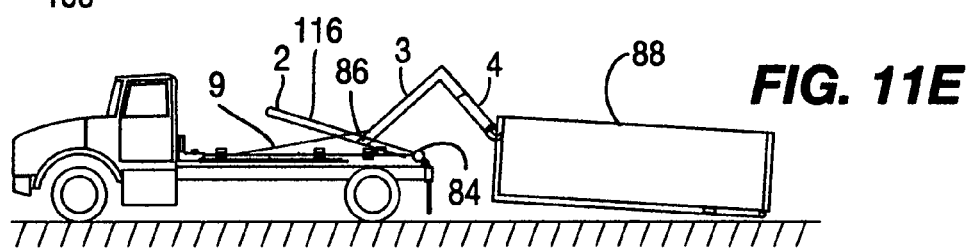
Figure 11F:
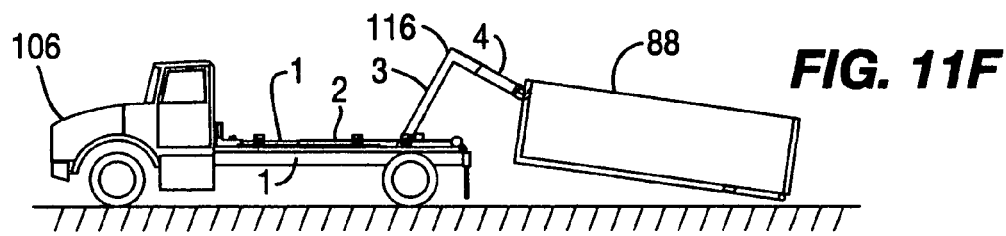
Figure 11G:
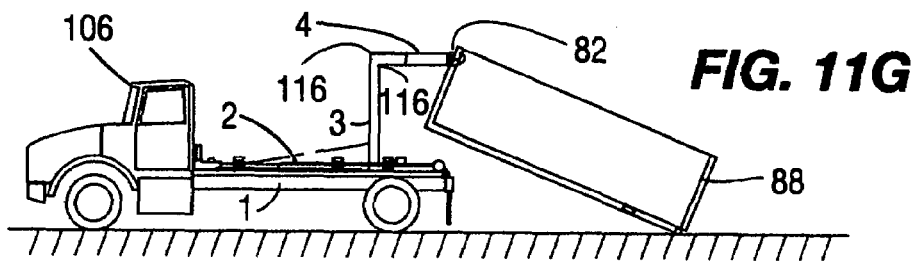
Figure 11H:
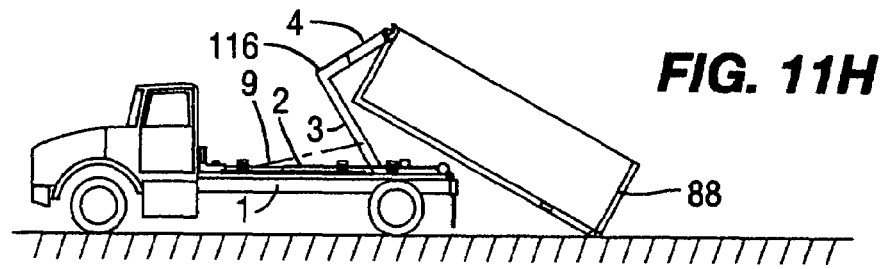
Figure 11I:
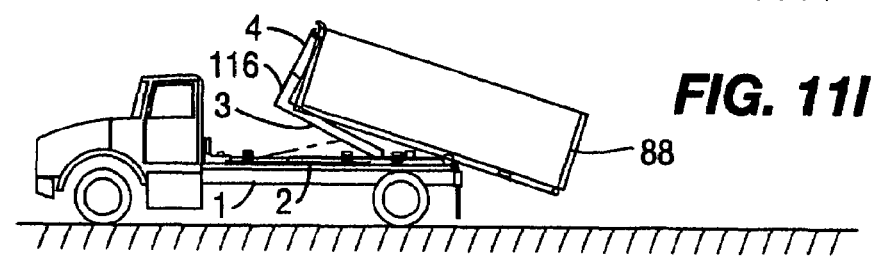
Figure 11J:
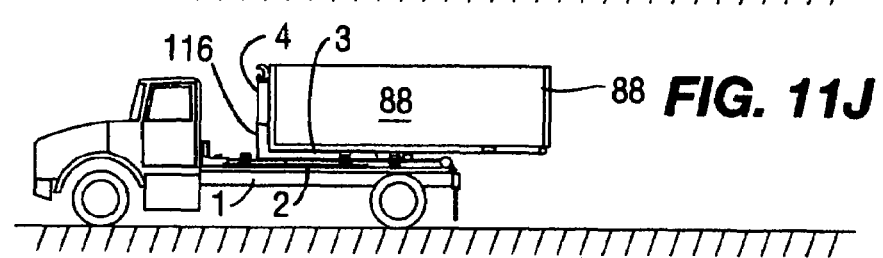
Figure 11K:
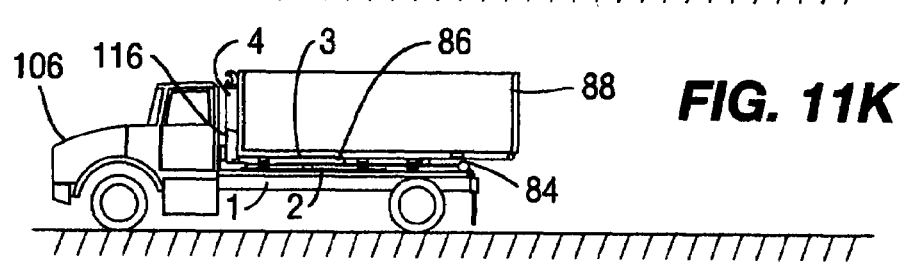

Loading of a container 88 onto the vehicle 106 is shown by the sequence starting at FIG. 11A and running through FIG. 11K. Unloading of the container 88 is shown in the operational steps performed in the opposite sequence starting at FIG. 11K through FIG. 11A. During both of these sequential operations, the double articulation capability of the relative movement of the arm 3 with respect to the pivot frame 2 and of the pivot frame 2 with respect to the main fixed frame 1 are clearly shown. The first mode of articulation is shown being performed about the first articulation axis or first pivot axis 84 and the second mode of articulation is shown being conducted through the second articulation axis or second pivot axis 86. The first articulation axis 84 provides the axis of relative pivotal movement of the pivot frame 2 with respect to the fixed frame 1 whereas the second articulation axis 86 provides the axis of relative pivotal movement of the combined assembly including the arm 3 and jib 4 with respect to the pivot frame 2. FIG. 11D shows the pivot frame 2 rotated about the first pivot axis 84 relative to the fixed main frame 1 and extending forwardly toward the truck cab 108 extending the rear portion of the frame 1. This figure also shows the arm 3 and the jib 4 in a position pivoted about the second pivot axis 86 to extend rearwardly from the pivot frame 2 with the jib 4 extending further outwardly rearwardly therefrom to facilitate engagement of the hook 82 with respect to a container 88 positioned rearwardly therefrom to facilitate moving it on or off of the vehicle 106.

Figure 11L:
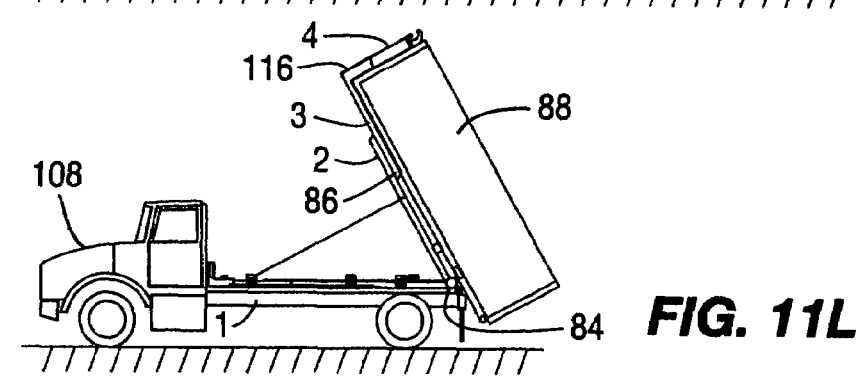

Another mode of operation of the apparatus of the present invention, other than loading and unloading is the dumping operation which is shown by the FIGS. 11K to 11L. Once dumping is completed then the movement sequence is reversed as shown from FIG. 11L to 11K which returns the container 88 to the level position retained on the vehicle. During dumping it is important that the second mode of articulation around the second pivot axis 86 be prevented which allows pivoting of the jib 4 and arm 3 together as a single unit along with the pivot frame 2 between the positions defined by FIGS. 11L and 11K. As such, the locking mechanism of the present invention is important for selectively restricting such pivotal movement during dumping. As can be seen in the dumping operation between steps shown in FIG. 11K and FIG. 11L, the pivot frame 2, the arm 3 and the jib 4 should all pivot together as a single locked assembly about the first pivot axis 84.

The jib 4 of the present invention is slidably mounted with respect to the arm 3 such as to be longitudinally slidable with respect thereto. The sliding movement is preferably facilitated by a utilizing a construction which engages the arm 3 to the jib 4 in a telescopingly moveable manner. This sliding movement normally occurs as the first or last step in the sequence for container loading or unloading. The jib 4 can telescopingly slide further into the arm 3 in a direction away from the cab 108 as shown by movement from the position of FIG. 11A through FIG. 11C. Alternatively, the jib 4 can telescopingly slide further away from the arm 3 in a direction toward cab 108 as shown by movement from the position of FIG. 11J through FIG. 11K.

Jib 4 and arm 3 can pivot along with the pivot frame 2 as a single unit during dumping by mutual rotation therewith about the first pivot axis 84. Alternatively the jib 4 and the arm 3 can pivot together in a manner which is independent of any movement of the pivot frame 2 by rotation thereof around the second pivot axis 86. This second pivot axis 86 is defined as the second mode of articulation of the present invention which is usable only during loading and unloading of containers onto and off of the main frame 1 of a vehicle and is not used during dumping.

The locking means 114 of the present invention is novel in the construction and the means of powering thereof. In particular powering of the locking means 114 is achieved by the configuration of the locking means 114 itself as well as by the movement of the jib 4 with respect to the arm 3 which in this embodiment results from the telescopingly movable relative construction between these two parts. The initial movement of the jib 4 to the right as shown in FIGS. 11A, B and C illustrates the various stages of movement of the jib 4 as it moves from the fully extended position shown in FIG. 11A to the fully retracted position shown in FIG. 11C. When the jib 4 is in the extended position shown in FIG. 11A the arm 3 will be locked with respect to the pivot frame 2 thereby preventing relative rotation therebetween through the first articulation axis 84. On the other hand when the jib 4 moves to the right as shown in FIG. 11C to the retracted position the locking means 114 will be disengaged by the portion 24 of jib 4 which is designed to be brought into contact with rollers 90. This movement will cause the locking means 114 to move to the unlocked position which facilitates the material handling steps for loading and unloading of a container as shown in FIGS. 11C through 11J.

It should be appreciated that the actual configuration of the locking means 114 of the present invention can be of many different embodiments. However, one particular embodiment is shown in the present invention. With this embodiment a link arm 6 is pivotally mounted about an axis 92 relative to the container engaging mechanism 116. Container engaging mechanism 116 defines those components which are vertically movable responsive to longitudinal extension or contraction of the lift cylinder 9.

Figure 3:
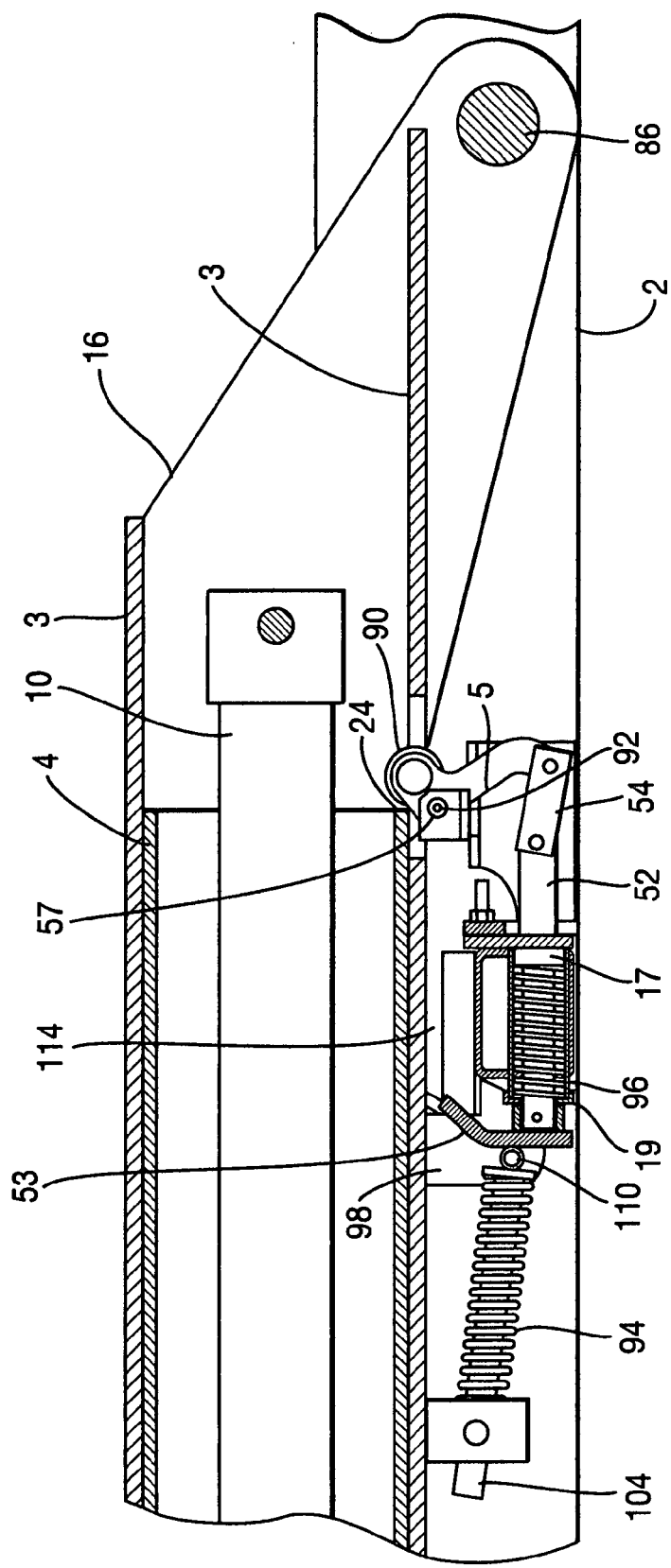
FIG. 3 is a side plan view of an embodiment of the locking mechanism showing particularly the articulated locking means and lock engagement arm of an embodiment of the present invention.

As the jib 4 moves to the right relative to the arm 3 as shown in FIGS. 11A, B and C, the roller contact surface 24 of jib 4 will also move to the right as shown best in FIG. 3 and will come into abutment with respect to the rollers 90. Rollers 90 are mounted on the link arm 6. Link arm 6 is rotatably mounted with respect to the container engaging mechanism 116 along an axis 92 of a link arm pin 57. Link arm pin 57 extends through the container engaging mechanism 116 and through the link arm 6 to facilitate rotational movement of link arm 6 responsive to the jib 4 being brought into contact with the rollers 90.

Figure 4:
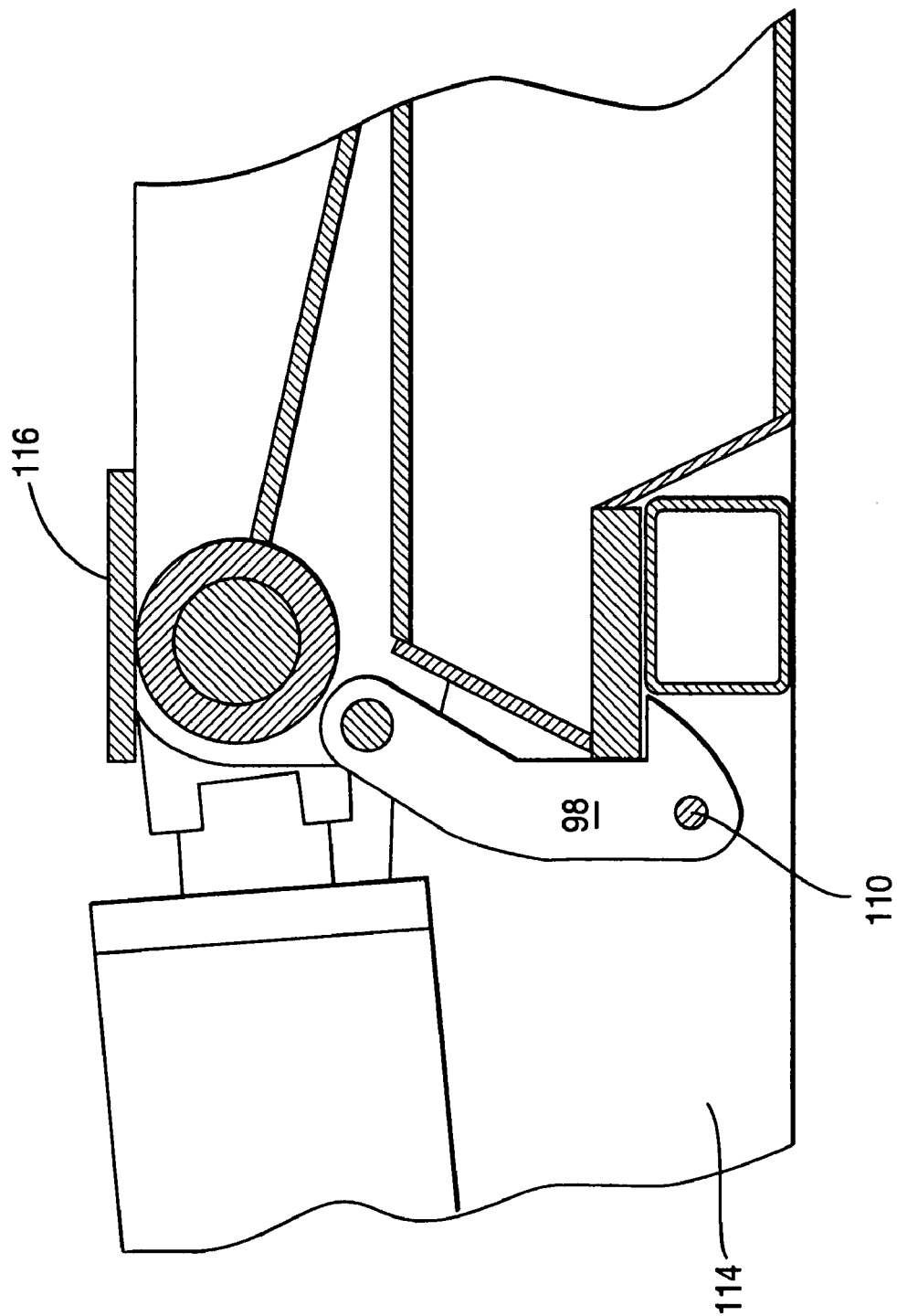
FIG. 4 is a side plan view showing the locking arm engaging a portion of the main frame fixed of the present invention.
Figure 5:
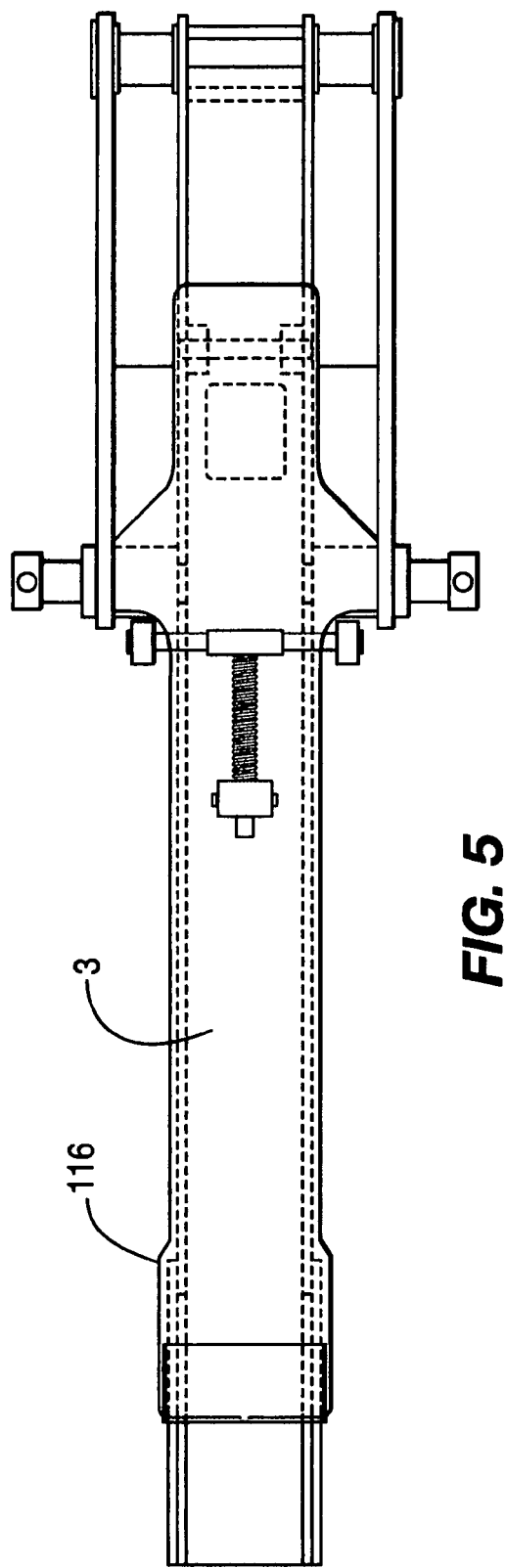
FIG. 5 is a top plan view of a portion of the present invention showing the arm engaged with a jib.
Figure 6:
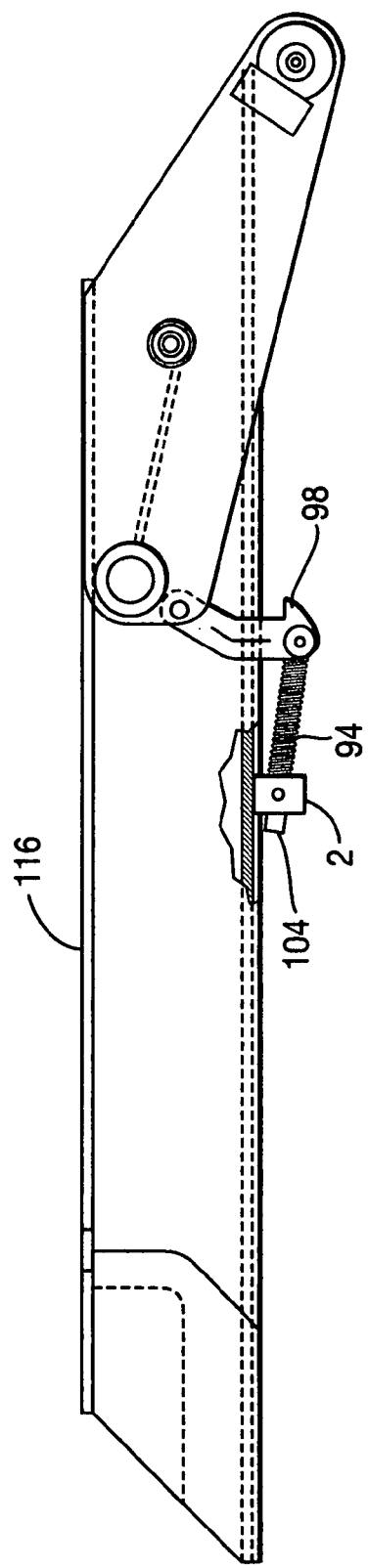
FIG. 6 is a side plan view of this same embodiment shown in FIG. 5.
Figure 7:
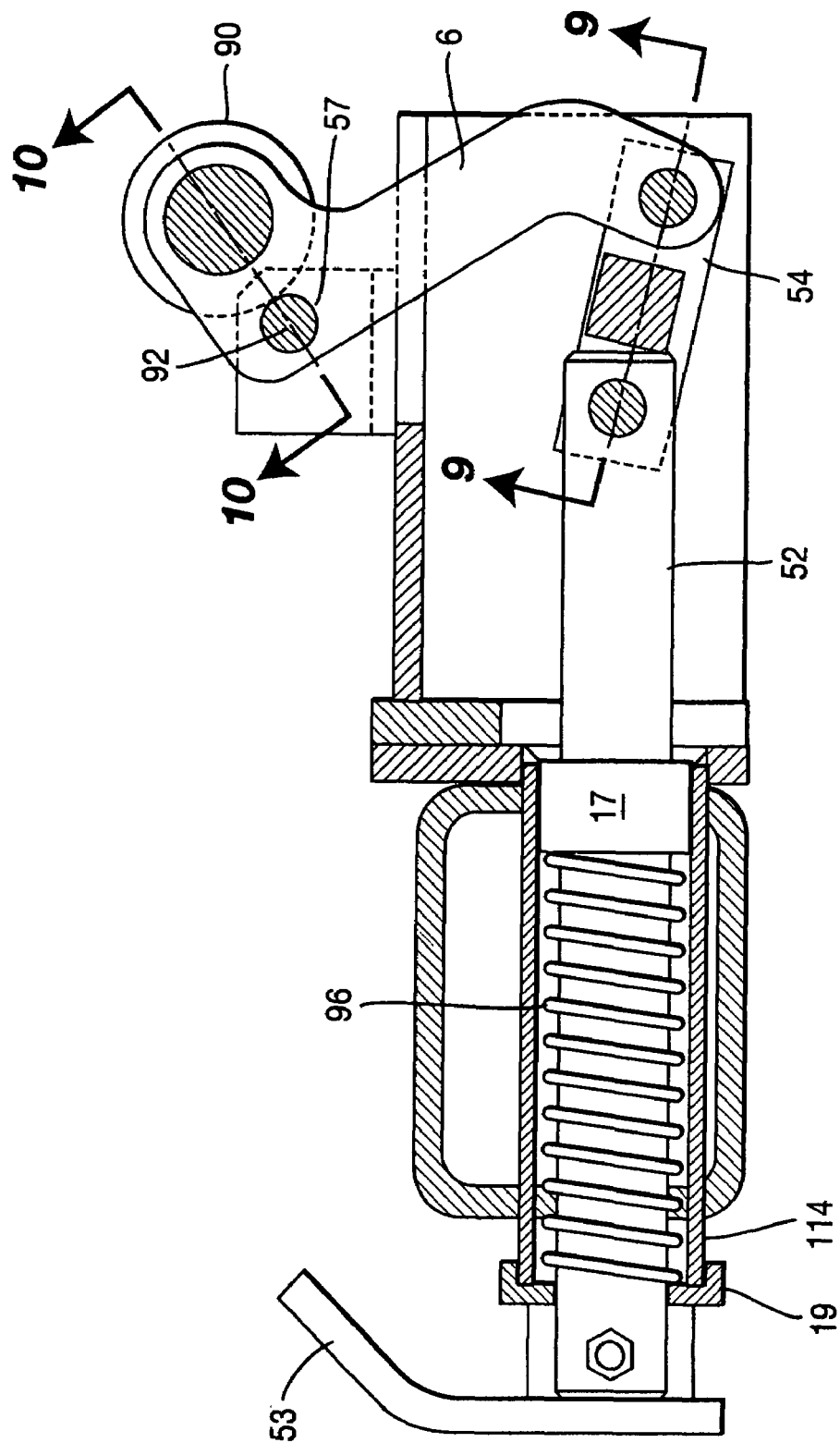
FIG. 7 is a cross-sectional view of FIG. 8 along lines A-A.
Figure 8:
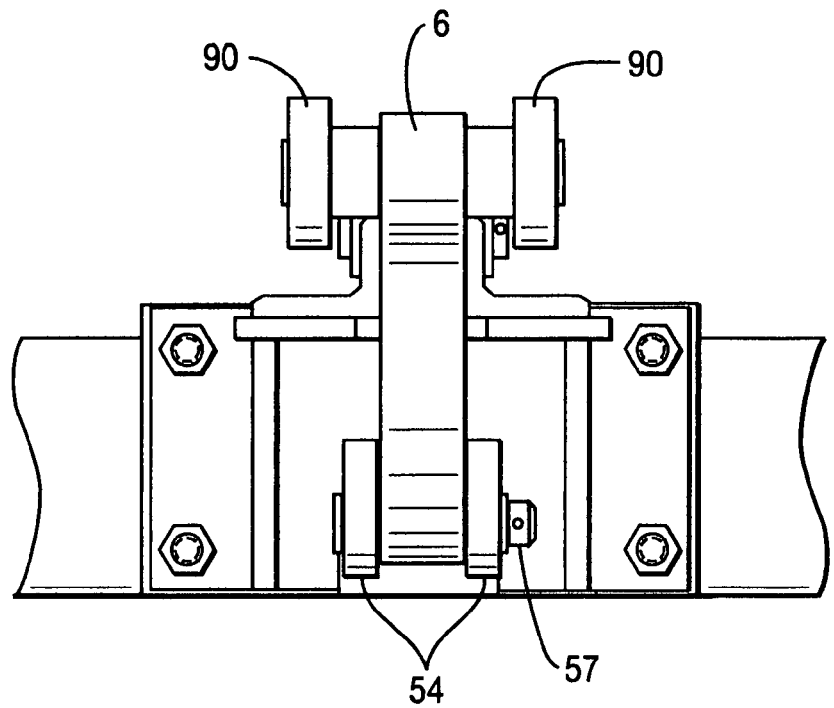
FIG. 8 is an end plan view of an embodiment of the locking linkage of the present invention and the pushing arm.
Figure 9:
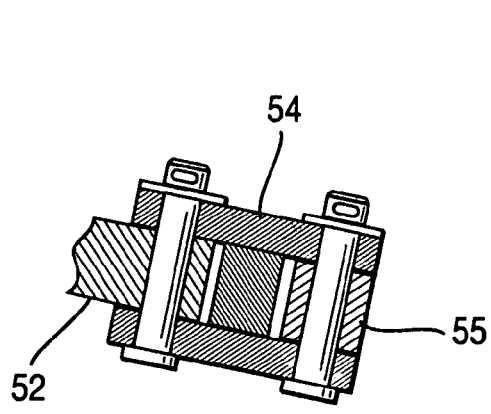
FIG. 9 is a cross-sectional view of FIG. 7 along lines C-C.
Figure 10:
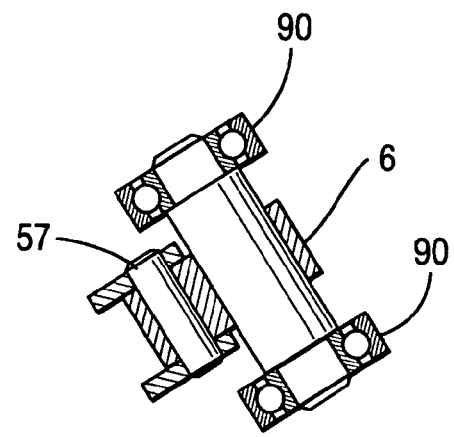
FIG. 10 is a cross-sectional view of FIG. 7 along lines B-B.

As shown in FIG. 3 this abutment and continuous movement will cause the link arm 6 to rotate in a clockwise direction about axis 92 of the link arm pin 57. This rotation will be connected through linkage 5 to a pusher rod 52. Pusher rod 52 includes a pusher member 53 positioned on the forwardmost end shown to the left in FIG. 3. This pusher member 53 is positioned to be selectively engageable with respect to a locking stud 110 which is fixedly secured with respect to the locking plate 98. It is the locking plate 98 that is movable to the left from the position shown in FIG. 3 for selectively engaging and locking of the arm 3 with respect to the pivot frame 2 to selectively prevent or allow relative pivotal movement relative to one another about the second pivot axis or second articulation axis 86. The locking plate 98 is shown in the locked position in FIG. 3 but is also shown in the locked position in FIG. 4.

A locking plate return spring rod 104 is secured to the container engaging mechanism 116 and is also secured to the locking stud 110 extending outwardly from the locking plate 98. This locking plate return spring rod 104 includes a locking plate engagement spring 94 extending therearound which is adapted to compress responsive to movement of the locking plate 98 to the left as shown in FIG. 3. This compression will be operative to continuously urge locking plate 98 to move to the right as shown in FIG. 3 to the locked position. The force exerted by the first spring 94 or locking plate engagement spring 94 will be overcome by the pressure exerted by the jib contact surface 24 against rollers 90 whenever the jib 4 is located in the fully retracted position. However, once the jib 4 initiates movement to the left shown by the sequence of steps from FIG. 11C through B through A, then the first spring or locking plate engagement spring 94 will exert a pressure along the axis of locking plate return spring rod 104 to urge the locking plate 98 to move to the right as shown in FIG. 3 which corresponds to the locked position.

The linkage 5 extending from the link arm 6 to the pusher rod 52 achieves accurate control of the pusher member 53 for selectively and periodically urging of the locking plate 98 to the left as shown in FIG. 3 which corresponds to the unlocked position. An intermediate link 54 is preferably pivotally secured with respect to the link arm 6 at one end and with respect to the pusher rod 52 at the other end. In this manner the rotational movement capability of the link arm 6 can easily be transformed into the linear movement of the pusher rod 52.

A first pusher rod ring 17 is preferably fixedly secured to the pusher rod 52 to move therewith. A second pusher rod ring 19 is preferably fixedly secured to the container engaging mechanism 116 adjacent to the pusher rod 52 and defines an aperture through which the pusher rod 52 is movable. A second spring or pusher return spring 96 is positioned coiled about the outside of pusher rod 52 between the first pusher rod ring 17 and the second pusher rod ring 19. As such, as the roller contact surface 24 of jib 4 moves to the right as shown in FIG. 3 the link arm 6 will rotate clockwise because of the force exerted on the rollers 90 by the surface 24. This will cause intermediate link 54 to move to the left and will urge the pusher rod 52 to move to the left. The pusher member 53 will move to the left along with the pusher rod 52 and will be brought into abutting contact with the locking stud 110 fixedly secured to the locking plate 98. This will cause the locking plate 98 to move from the locking position shown in FIG. 3 to the left or unlocked position wherein the locking means 114 becomes disengaged and pivotal movement of the arm 3 relative to the pivot frame 2 is again made possible.

Thereafter when the jib 4 moves to the left relative to arm 3 as shown in FIG. 3 and the roller contact surface 24 releases from the rollers 90 then the force stored in the pusher return spring 96 will cause the pusher rod 52 to move to the right and the intermediate link 54 to move to the right causing counterclockwise rotation of link arm 6 around the axis 92 of the link arm pin 57 about which it is rotatable. In this manner the pusher rod 52 and the pusher member 53 secured thereto will be released from abutting forcible contact with the locking stud 110 which in this manner allows the locking plate 98 to again return to the locked position engaging the arm 3 with respect to the pivot frame 2 for preventing relative rotation therebetween. To be assured that the locking plate 98 will move to the fully engaged locking position, the locking plate engagement spring 94 which extends around the locking plate return spring rod 104 will exert force against the locking stud 110 to the right to further assure that the locking plate 98 will return to the locked or fully engaged position.

Thus, with this configuration for the locking means 114 whenever the jib 4 is in the retracted position shown in FIG. 11C the locking means 114 will be in the unlocked position. Also whenever the jib 4 is in the extended position as shown in FIG. 11A the locking means 114 will be in the fully engaged or locked position. This is an important operational characteristic of the present invention.

A jib cylinder 10 is also included for powering relative movement of jib 4 with respect to the arm 3 such that the apparatus of the present invention can move between the position shown in FIGS. 11A, B and C. The sole purpose of the jib cylinder 10 in this embodiment is to move the jib 4 between the retracted and extended positions, respectively. The longitudinally extendable lifting means 9 preferably comprises two separate lift cylinders 21 and 22. The first lift cylinder 21 and the second lift cylinder 22 are best shown in FIGS. 1, 2 and 11A-L. To further facilitate operational use of the present invention it is preferable that a container engaging hook member 82 be included on the outermost portion of the jib 4. This hook 82 is operational to engage a container to facilitate handling thereof as the container engaging mechanism 116 of the present invention moves through the various positions shown in the various stations displayed in the various figures in FIG. 11.

In this preferred configuration of the present invention the first and second articulation axis 84 and 86 respectively are located in the rearward direction 112 from the point of securement of the first and second lift cylinders 21 and 22 with respect to the fixed or main frame 1. In this manner operation of the container engaging mechanism 116 and general overall handling of containers 88 is facilitated.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A locking mechanism for a double articulating hook lift apparatus usable for loading, unloading, transporting and dumping of containers removably positionable upon a vehicle having a fixed frame comprising:

A. a lift powering means being longitudinally extensible and retractable and being attached with respect to the fixed frame of the vehicle;

B. a container engaging mechanism attached to said lift powering means to be movable therewith, said container engaging means also being pivotally movably attached with respect to the fixed frame of the vehicle at a positioned spaced remotely from said lift powering means to allow pivotal movement of said container engaging mechanism with respect to the fixed frame responsive to extension and retraction of said lift powering means to facilitate container handling, said container engaging means comprising:

(1) a pivot frame means pivotally attached with respect to the fixed frame at a position spatially disposed from said lift powering means to be rotatably moveable with respect thereto, said pivot frame means and the fixed frame together defining a first articulation axis extending therebetween about which said pivot frame means is pivotally moveable relative to the fixed frame to facilitate container handling;

(2) an arm means pivotally attached with respect to said pivotal frame means and extending outwardly therefrom, said arm means and said pivot frame means together defining a second articulation axis extending therebetween about which said arm means is pivotally moveable relative to said pivot frame means to facilitate container handling;

(3) a jib means moveably attached with respect to said arm means, said jib means being slidably moveable with respect to said arm means between an extended position extending outwardly away from said arm means and a retracted position adjacent said arm means;

C. a locking means movable between a locked position preventing pivotal movement of said arm means with respect to said pivot frame means about said second articulation axis and an unlocked position allowing pivotal movement of said arm means with respect to said pivot frame means about said second articulation axis, said jib means being operative responsive to movement thereof to said retracted position to urge movement of said locking means to the unlocked position, said jib means being operative responsive to movement thereof to said extended position to urge movement of said locking means to the locked position, said locking means including:

A. a link arm rotationally movably mounted to said container engaging mechanism;

B. a locking plate pivotally movably mounted to said container engaging mechanism; and C. locking linkage means connected to said link arm and said locking plate to cause movement of said locking plate of said locking means between the locked position and the unlocked position responsive to rotational movement of said link arm.

2. A locking mechanism for a double articulating hook lift apparatus usable for loading, unloading, transporting and dumping of containers removably positionable upon a vehicle having a fixed frame as defined in claim 1 wherein said jib means is adapted to be brought into abutting contact with respect to said locking means for urging movement thereof into the unlocked position responsive to movement of said jib means to the retracted position and wherein said jib means is adapted to be removed from abutting contact with respect to said locking means for allowing movement thereof into the locked position responsive to movement of said jib means to the extended position.

3. A locking mechanism for a double articulating hook lift apparatus usable for loading, unloading, transporting and dumping of containers removably positionable upon a vehicle having a fixed frame as defined in claim 1 wherein said jib means is telescopingly movably engaged with respect to said arm means to facilitate slidable relative movement of said jib means with respect to said arm means between the retracted and extending positions.

4. A locking mechanism for a double articulating hook lift apparatus usable for loading, unloading, transporting and dumping of containers removably positionable upon a vehicle having a fixed frame as defined in claim 1 wherein said locking means further includes a roller means rotatably mounted to said link arm.

5. A locking mechanism for a double articulating hook lift apparatus usable for loading, unloading, transporting and dumping of containers removably positionable upon a vehicle having a fixed frame as defined in claim 4 wherein said jib means is adapted to be brought into abutting contact with respect to said roller means responsive to movement thereof to the retracted position for urging rotational movement of said link arm to cause said locking linkage means to urge movement of said locking plate to the unlocked position.

6. A locking mechanism for a double articulating hook lift apparatus usable for loading, unloading, transporting and dumping of containers removably positionable upon a vehicle having a fixed frame as defined in claim 4 wherein said jib means is adapted to be removed from abutting contact with respect to said roller means responsive to movement thereof to the extended position for allowing rotational movement of said link arm to cause said locking linkage means to allow movement of said locking plate to the locked position.

7. A locking mechanism for a double articulating hook lift apparatus usable for loading, unloading, transporting and dumping of containers removably positionable upon a vehicle having a fixed frame as defined in claim 4 wherein said locking linkage means includes:
   A. a pusher rod longitudinally moveable with respect to said container engaging mechanism; and
   B. a pusher member secured to said pusher rod and movable therewith, said pusher member being selectively moveable into abutment with respect to said locking plate for urging thereof to the unlocked position.

8. A locking mechanism for a double articulating hook lift apparatus usable for loading, unloading, transporting and dumping of containers removably positionable upon a vehicle having a fixed frame as defined in claim 7 wherein said locking plate includes a locking stud means extending outwardly therefrom which is adapted to be abutted and pushed by said pusher member responsive to movement of said jib means to the retracted position to move said locking plate to the unlocked position.

9. A locking mechanism for a double articulating hook lift apparatus usable for loading, unloading, transporting and dumping of containers removably positionable upon a vehicle having a fixed frame as defined in claim 8 wherein said locking linkage means includes a locking plate engagement spring means extending between said locking stud means of said locking plate and said container engagement mechanism, said locking plate engagement spring means being compressed responsive to movement of said locking plate to the unlocked position and exerting force continuously against locking stud means of said locking plate to urge same toward the locked position.

10. A locking mechanism for a double articulating hook lift apparatus usable for loading, unloading, transporting and dumping of containers removably positionable upon a vehicle having a fixed frame as defined in claim 8 wherein said locking linkage means includes a pusher return spring means positioned around said pusher rod which is compressible responsive to movement of said locking means to the unlocked position to facilitate return of said locking linkage means, said link arm and said locking plate to the locked position responsive to movement of said jib means away from contact with respect to said roller means.

11. A locking mechanism for a double articulating hook lift apparatus usable for loading, unloading, transporting and dumping of containers removably positionable upon a vehicle having a fixed frame as defined in claim 8 wherein said locking linkage means further includes an intermediate link member pivotally moveably secured to said pusher rod and pivotally moveably secured to said pusher member for effectively converting the rotational movement of the link arm to the translational movement of said pusher rod.

12. A locking mechanism for a double articulating hook lift apparatus usable for loading, unloading, transporting and dumping of containers removably positionable upon a vehicle having a fixed frame as defined in claim 10 wherein said locking linkage means further includes:
   A. a first pusher rod ring extending around said pusher rod and affixed thereto to be movable longitudinally therewith; and
   B. a second pusher rod ring being stationary with respect to said pusher rod and defining a ring aperture therein with said pusher rod extending movably therethorough, said second pusher rod being moveably positioned within said ring aperture and said second pusher return spring means extending around said pusher rod between said first pusher rod ring and said second pusher rod ring to facilitate return of said locking linkage means to the locked position responsive to movement of said jib means to the extended position.

13. A locking mechanism for a double articulating hook lift apparatus usable for loading, unloading, transporting and dumping of containers removably positionable upon a vehicle having a fixed frame as defined in claim 1 wherein said jib means includes a container engaging hook member to facilitate holding and retaining of containers by said jib means.

14. A locking mechanism for a double articulating hook lift apparatus usable for loading, unloading, transporting and dumping of containers removably positionable upon a vehicle having a fixed frame as defined in claim 1 wherein said lift powering means comprises a lift cylinder means being longitudinally extensible and retractable.

15. A locking mechanism for a double articulating hook lift apparatus usable for loading, unloading, transporting and dumping of containers removably positionable upon a vehicle having a fixed frame as defined in claim 1 wherein said second articulation axis is located forwardly relative to said first articulation axis on the fixed frame of the vehicle.

16. A locking mechanism for a double articulating hook lift apparatus usable for loading, unloading, transporting and dumping of containers removably positionable upon a vehicle having a fixed frame as defined in claim 15 wherein said lifting powering means is pivotally secured to the fixed frame at a position forwardly located relative to said first articulation axis and said second articulation axis on the fixed frame of the vehicle.

17. A locking mechanism for a double articulating hook lift apparatus usable for loading, unloading, transporting and dumping of containers removably positionable upon a vehicle having a fixed frame as defined in claim 1 wherein said first articulation axis and said second articulation axis are spatially disposed from one another and each extending approximately transversely with respect to the fixed frame of the vehicle.

18. A locking mechanism for a double articulating hook lift apparatus usable for loading, unloading, transporting and dumping of containers removably positionable upon a vehicle having a fixed frame comprising:
  A. a lift powering means comprising a lift cylinder means being longitudinally extensible and retractable and being attached with respect to the fixed frame of the vehicle;
  B. a container engaging mechanism attached to said lift powering means to be movable therewith, said container engaging means also being pivotally movably attached with respect to the fixed frame of the vehicle at a positioned spaced remotely from said lift powering means to allow pivotal movement of said container engaging mechanism with respect to the fixed frame responsive to extension and retraction of said lift powering means to facilitate container handling, said container engaging means comprising:
    (1) a pivot frame means pivotally attached with respect to the fixed frame at a position spatially disposed from said lift powering means to be rotatably moveable with respect thereto, said pivot frame means and the fixed frame together defining a first articulation axis extending therebetween about which said pivot frame means is pivotally moveable relative to the fixed frame to facilitate container handling;
    (2) an arm means pivotally attached with respect to said pivot frame means and extending outwardly therefrom, said arm means and said pivot frame means together defining a second articulation axis extending therebetween about which said arm means is pivotally moveable relative to said pivot frame means to facilitate container handling, said second articulation axis being located forwardly relative to said first articulation axis on the fixed frame of the vehicle;
    (3) a jib means moveably attached with respect to said arm means, said jib means being slidably moveable with respect to said arm means between an extended position extending outwardly away from said arm means and a retracted position adjacent said aim means, said jib means being telescopingly movably engaged with respect to said aim means to facilitate slidable relative movement of said jib means with respect to said aim means between the retracted and extending positions, said jib means including a container engaging hook member to facilitate holding and retaining of containers by said jib means;
  C. a locking means movable between a locked position preventing pivotal movement of said arm means with respect to said pivot frame means about said second articulation axis and an unlocked position allowing pivotal movement of said arm means with respect to said pivot frame means about said second articulation axis, said jib means being operative responsive to movement thereof to said retracted position to urge movement of said locking means to the unlocked position, said jib means being operative responsive to movement thereof to said extended position to urge movement of said locking means to the locked position, said jib means is adapted to be brought into abutting contact with respect to said locking means for urging movement thereof into the unlocked position responsive to movement of said jib means to the retracted position and wherein said jib means is adapted to be removed from abutting contact with respect to said locking means for allowing movement thereof into the locked position responsive to movement of said jib means to the extended position, said locking means including:
    (1) a link arm rotationally movably mounted to said container engaging mechanism;
    (2) a locking plate pivotally movably mounted to said container engaging mechanism;
    (3) locking linkage means connected to said link arm and said locking plate to cause movement of said locking plate of said locking means between the locked position and the unlocked position responsive to rotational movement of said link arm; and
    (4) a roller means rotatably mounted to said link arm, said jib means being adapted to be brought into abutting contact with respect to said roller means responsive to movement thereof to the retracted position for urging rotational movement of said link arm to cause said locking linkage means to urge movement of said locking plate to the unlocked position, said jib means being adapted to be removed from abutting contact with respect to said roller means responsive to movement thereof to the extended position for allowing rotational movement of said link arm to cause said locking linkage means to allow movement of said locking plate to the locked position.

19. A locking mechanism for a double articulating hook lift apparatus usable for loading, unloading, transporting and dumping of containers removably positionable upon a vehicle having a fixed frame comprising:
  A. a lift powering means comprising a lift cylinder means being longitudinally extensible and retractable and being attached with respect to the fixed frame of the vehicle;
  B. a container engaging mechanism attached to said lift powering means to be movable therewith, said container engaging means also being pivotally movably attached with respect to the fixed frame of the vehicle at a positioned spaced remotely from said lift powering means to allow pivotal movement of said container engaging mechanism with respect to the fixed frame responsive to extension and retraction of said lift powering means to facilitate container handling, said container engaging means comprising:
(1) a pivot frame means pivotally attached with respect to the fixed frame at a position spatially disposed from said lift powering means to be rotatably moveable with respect thereto, said pivot frame means and the fixed frame together defining a first articulation axis extending therebetween about which said pivot frame means is pivotally moveable relative to the fixed frame to facilitate container handling;
(2) an arm means pivotally attached with respect to said pivotal frame means and extending outwardly therefrom, said arm means and said pivot frame means together defining a second articulation axis extending therebetween about which said arm means is pivotally moveable relative to said pivot frame means to facilitate container handling, said second articulation axis being located forwardly relative to said first articulation axis on the fixed frame of the vehicle, said lifting cylinder means being pivotally secured to the fixed frame at a position forwardly located relative to said first articulation axis and said second articulation axis on the fixed frame of the vehicle, said first articulation axis and said second articulation axis being spatially disposed from one another and each extending approximately transversely with respect to the fixed frame of the vehicle;
(3) a jib means moveably attached with respect to said arm means, said jib means being slidably moveable with respect to said arm means between an extended position extending outwardly away from said arm means and a retracted position adjacent said arm means, said jib means being telescopingly movably engaged with respect to said arm means to facilitate slidable relative movement of said jib means with respect to said aim means between the retracted and extending positions, said jib means including a container engaging hook member to facilitate holding and retaining of containers by said jib means;
C. a locking means movable between a locked position preventing pivotal movement of said arm means with respect to said pivot frame means about said second articulation axis and an unlocked position allowing pivotal movement of said arm means with respect to said pivot frame means about said second articulation axis, said jib means being operative responsive to movement thereof to said retracted position to urge movement of said locking means to the unlocked position, said jib means being operative responsive to movement thereof to said extended position to urge movement of said locking means to the locked position, said jib means is adapted to be brought into abutting contact with respect to said locking means for urging movement thereof into the unlocked position responsive to movement of said jib means to the retracted position and wherein said jib means is adapted to be removed from abutting contact with respect to said locking means for allowing movement thereof into the locked position responsive to movement of said jib means to the extended position, said locking means including:
(1) a link arm rotationally movably mounted to said container engaging mechanism;
(2) a locking plate pivotally movably mounted to said container engaging mechanism;
(3) a roller means rotatably mounted to said link arm, said jib means being adapted to be brought into abutting contact with respect to said roller means responsive to movement thereof to the retracted position for urging rotational movement of said link arm to cause said locking linkage means to urge movement of said locking plate to the unlocked position, said jib means being adapted to be removed from abutting contact with respect to said roller means responsive to movement thereof to the extended position for allowing rotational movement of said link arm to cause said locking linkage means to allow movement of said locking plate to the locked position;
(4) locking linkage means connected to said link arm and said locking plate to cause movement of said locking plate of said locking means between the locked position and the unlocked position responsive to rotational movement of said link arm, aid locking linkage means further comprising;
  (a) a pusher rod longitudinally moveable with respect to said container engaging mechanism;
  (b) a pusher member secured to said pusher rod and movable therewith, said pusher member being selectively moveable into abutment with respect to said locking plate for urging thereof to the unlocked position;
  (c) a locking stud means extending outwardly from said locking plate, said locking stud means being adapted to be abutted and pushed by said pusher member responsive to movement of said jib means to the retracted position to move said locking plate to the unlocked position;
  (d) a locking plate engagement spring means extending between said locking stud means of said locking plate and said container engagement mechanism, said locking plate engagement spring means being compressed responsive to movement of said locking plate to the unlocked position and exerting force continuously against locking stud means of said locking plate to urge same toward the locked position;
  (e) a pusher return spring means positioned around said pusher rod which is compressible responsive to movement of said locking means to the unlocked position to facilitate return movement of said locking linkage means, said link arm and said locking plate to the locked position responsive to movement of said jib means away from contact with respect to said roller means;
  (f) an intermediate link member pivotally moveably secured to said pusher rod and pivotally moveably secured to said pusher member for effectively converting the rotational movement of the link arm to the translational movement of said pusher rod;
  (g) a first pusher rod ring extending around said pusher rod and affixed thereto to be movable longitudinally therewith; and
  (h) a second pusher rod ring being stationary with respect to said pusher rod and defining a ring aperture therein with said pusher rod extending movably therethrough, said second pusher rod being moveably positioned within said ring aperture and said second pusher return spring means extending around said pusher rod between said first pusher rod ring and said second pusher rod ring to facilitate return of said locking linkage means to the locked position responsive to movement of said jib means to the extended position.

* * * * *

UNITED STATES PATENT AND TRADEMARK OFFICE
CERTIFICATE OF CORRECTION

PATENT NO. : 7,278,816 B2 Page 1 of 1
APPLICATION NO. : 11/064190
DATED : October 9, 2007
INVENTOR(S) : Lazar Marmur and Gregory Krasnopolskiy It is certified that error appears in the above-identified patent and that said Letters Patent is hereby corrected as shown below:

In column 12, line 32, change "8" to -- 7 --.

In column 13, line 65, change "aim" to -- arm --.

In column 13, line 67, change "aim" to -- arm --.

In column 14, line 2, change "aim" to -- arm --.

In column 15, line 36, change "aim" to -- arm --.

In column 16, line 14, change "aid" to -- said --.

Signed and Sealed this

Seventeenth Day of June, 2008

JON W. DUDAS
*Director of the United States Patent and Trademark Office*